(12) United States Patent
Bruedigam et al.

(10) Patent No.: US 9,166,702 B2
(45) Date of Patent: Oct. 20, 2015

(54) SIGNAL LEVEL DETECT CIRCUIT WITH REDUCED LOSS-OF-SIGNAL ASSERTION DELAY

(71) Applicant: Micrel, Inc., San Jose, CA (US)

(72) Inventors: Ulrich Bruedigam, Frankfurt (DE); Tomislav Kapucija, Moorpark, CA (US)

(73) Assignee: Micrel, Inc., San Jose, CA (US)

( * ) Notice: Subject to any disclaimer, the term of this patent is extended or adjusted under 35 U.S.C. 154(b) by 58 days.

(21) Appl. No.: 14/070,816

(22) Filed: Nov. 4, 2013

(65) Prior Publication Data

US 2014/0286649 A1    Sep. 25, 2014

Related U.S. Application Data

(60) Provisional application No. 61/804,585, filed on Mar. 22, 2013.

(51) Int. Cl.
*H04B 10/079* (2013.01)
*H04B 10/69* (2013.01)

(52) U.S. Cl.
CPC .............. *H04B 10/69* (2013.01); *H04B 10/079* (2013.01)

(58) Field of Classification Search
None
See application file for complete search history.

(56) References Cited

U.S. PATENT DOCUMENTS

2013/0216241 A1* 8/2013 Proesel et al. ................. 398/213

\* cited by examiner

*Primary Examiner* — Darren E Wolf
(74) *Attorney, Agent, or Firm* — Van Pelt, Yi & James LLP

(57) ABSTRACT

A signal level detect circuit configured to assess an input signal with varying amplitude signal levels and to generate an indicator signal includes an input circuit configured to receive the input signal and to process the input signal, the input circuit including a first node on which the input signal is sampled; a comparator configured to compare the processed input signal to a signal level threshold and generate a comparator output signal; and an active discharge circuit configured to provide a first discharge current to the first node in response to the comparator output signal. The comparator output signal changes from a low output state to a high output state in response to the comparator input signal, and the active discharge circuit generates the first discharge current to discharge the sampled input signal on the first node after the comparator output signal changes to the high output state.

19 Claims, 8 Drawing Sheets

SIGNAL LEVEL DETECT CIRCUIT WITH REDUCED LOSS-OF-SIGNAL ASSERTION DELAY

CROSS REFERENCE TO OTHER APPLICATIONS

This application claims priority to U.S. Provisional Patent Application No. 61/804,585 entitled SIGNAL LEVEL DETECT CIRCUIT WITH REDUCED LOSS-OF-SIGNAL ASSERTION DELAY filed Mar. 22, 2013 which is incorporated herein by reference for all purposes.

BACKGROUND OF THE INVENTION

A passive optical network (PON) is a point-to-multipoint, fiber to the premises optical distribution network architecture in which unpowered optical splitters are used to enable a single optical fiber to serve multiple premises, typically 16-128. A PON consists of an optical line terminal (OLT) at the service provider's central office and a number of optical network terminals (ONT) or optical network units (ONUs) near end users. A PON reduces the amount of fiber and central office equipment required compared with point to point architectures.

In a PON, downstream signals are broadcasted to all premises sharing multiple fibers. Encryption is used to prevent eavesdropping. Upstream signals are combined using a multiple access protocol, usually time division multiple access (TDMA). The OLT may range the ONUs in order to provide time slot assignments for upstream communication.

In communication systems, a receiver is disposed to detect an input signal where the input signal often has signal levels with varying amplitude. For example, signals transmitted in a passive optical network (PON) often have signal levels with widely varying amplitude. It is sometimes necessary for the receiver to make a determination of the presence or absence of a signal at the input and to provide an indication thereof.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a signal level detect circuit for detecting an input signal with varying amplitude signal levels incorporates an active discharge circuit to minimize the time delay for loss of signal assertion. In some embodiments, the active discharge circuit supplies a discharge current when the input signal is greater than a signal level threshold by a certain offset to reduce the time delay for asserting the loss-of-signal indicator when the input signal ends.

In one embodiment, the signal level detect circuit is applied in a post amplifier or a limiting post amplifier of a burst mode receiver to detect an incoming burst signal. The burst mode receiver may be deployed in a PON for detecting a burst signal being transmitted using time division multiplexing. The signal level detect circuit reduces the delay time for the assertion of the loss-of-signal (LOS) signal, or the deassertion of the signal detect (SD) signal, after the last data pulse of the burst signal has been received. In other embodiments, the signal level detect circuit may be applied to detect a carrier signal to generate a carrier detect signal. In general, the signal level detect circuit of the present invention can be applied in any electrical system to detect for the presence or absence of an input signal where the input signal has signal levels with varying amplitude. For example, the input signal may have an amplitude variation from a peak to peak voltage in the low millivolt range to hundreds of millivolt range.

Limiting Post Amplifier

Figure 1:
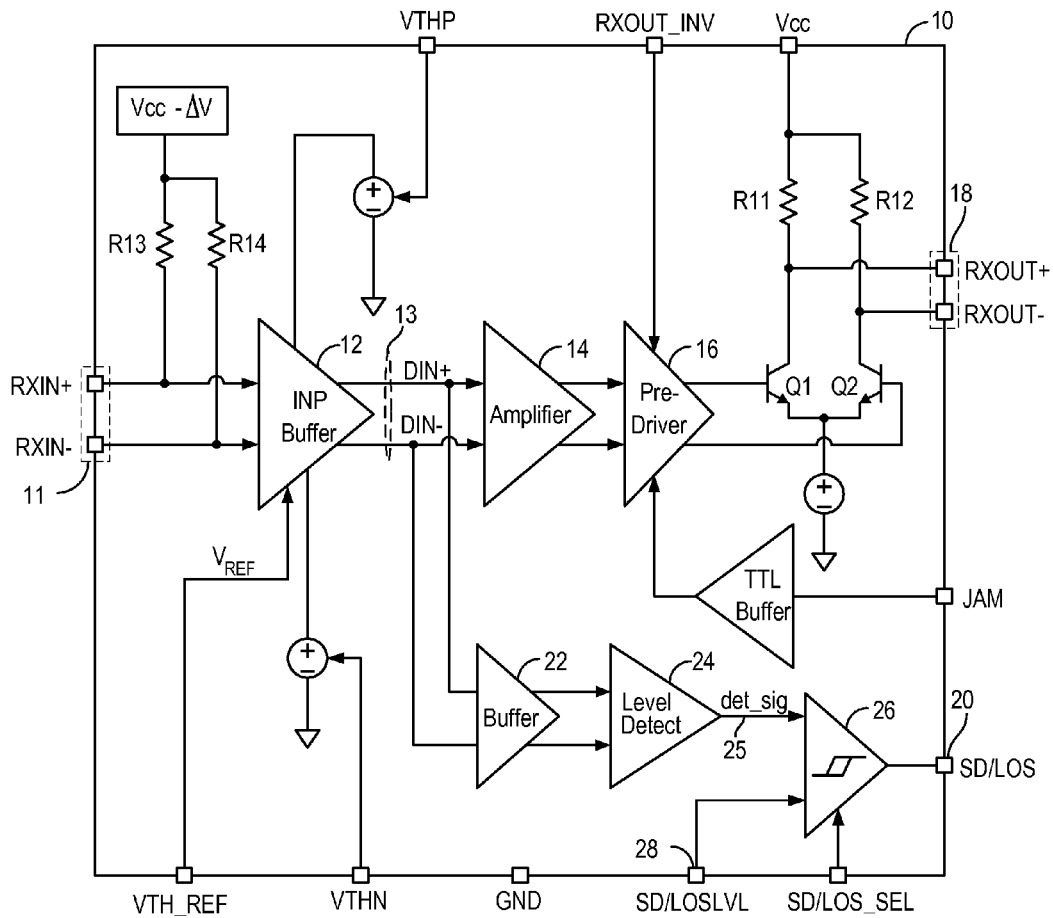
FIG. 1 is a block diagram of a limiting post amplifier in embodiments of the present invention.

In some embodiments, the signal level detect circuit is incorporated in a limiting post amplifier. The limiting post amplifier can be applied in a burst mode receiver for receiving a burst signal, such as a burst signal in a PON. FIG. 1 is a block diagram of a limiting post amplifier 10 configured to receive a differential data input signal (RXIN+/−) on a differential data input terminal 11 and to generate a differential data output signal (RXOUT+/−) on a differential data output terminal 18. The limiting post amplifier 10 includes a data signal path which is formed by an input buffer 12 receiving the differential data input signal, an amplifier 14, a pre-driver 16 and transistors Q1 and Q2 forming a differential pair. Transistors Q1 and Q2 are driven by the pre-driver 16 to generate the differential data output signal RXOUT+/−. In the present embodiment, transistors Q1 and Q2 are NPN bipolar transistors and resistors R11 and R12 provide loading for the transistors Q1 and Q2 of the differential pair. In other embodiments, the differential pair can be formed using other transistor types and using other loading elements. Furthermore, in the present embodiment, the input buffer 12 can be implemented as an amplifier. That is, the input buffer 12 can have a gain of 1 or greater than 1.

The limiting post amplifier 10 further incorporates a signal level detect path to detect for the presence or absence of a data input signal at the data input terminal 11 and to generate a loss-of-signal (LOS) signal or a signal detect (SD) signal as an indicator on an output terminal 20 of the limiting post amplifier 10. More specifically, the signal level detect path detects for an input signal level above a certain threshold as an indication of a possible valid signal at the data input terminal 11. The signal level detect path asserts the LOS signal (or deasserts the SD signal) when a detected input signal level is below the given threshold and deasserts the LOS signal (or asserts the SD signal) when a detected input signal level is above the given threshold.

In the example shown, the signal level detect path includes a buffer 22 as an input stage receiving the buffered data input signal DIN+ and DIN− on a pair of differential input nodes 13 from the output of the input buffer 12 and generating another buffered data input signal. The signal level detect path further includes a level detect circuit 24 receiving the buffered data input signal from the buffer 22 and generating a detected signal det_sig (node 25) and a comparator 26 comparing the detected signal to a signal level threshold (or a LOS threshold). The signal level threshold is a threshold voltage value in the present embodiment but can be a threshold current value in other example implementations. In the present embodiment, the signal level threshold voltage value (SD/LOSLVL) is programmable and is provided to the limiting post amplifier 10 as an input signal on an input terminal 28. The comparator 26 generates the SD/LOS indicator signal indicating the presence or absence of a data input signal at the data input terminal 11. When the detected signal det_sig (node 25) is below the signal level threshold, the LOS signal is asserted or the SD signal is deasserted. Alternately, when the detected signal (node 25) is above the signal level threshold, the LOS signal is deasserted or the SD signal is asserted.

The block diagram in FIG. 1 includes other circuit components for the implementation of the limiting post amplifier 10 in the present example. The remaining circuit components of limiting post amplifier 10 not described above are illustrative only and not intended to be limiting. Furthermore, the remaining circuit components of limiting post amplifier 10 not described above are not critical to the practice and implementation of the signal level detect circuit of the present invention and are provided to illustrate an example implementation of the limiting post amplifier only.

Figure 2:
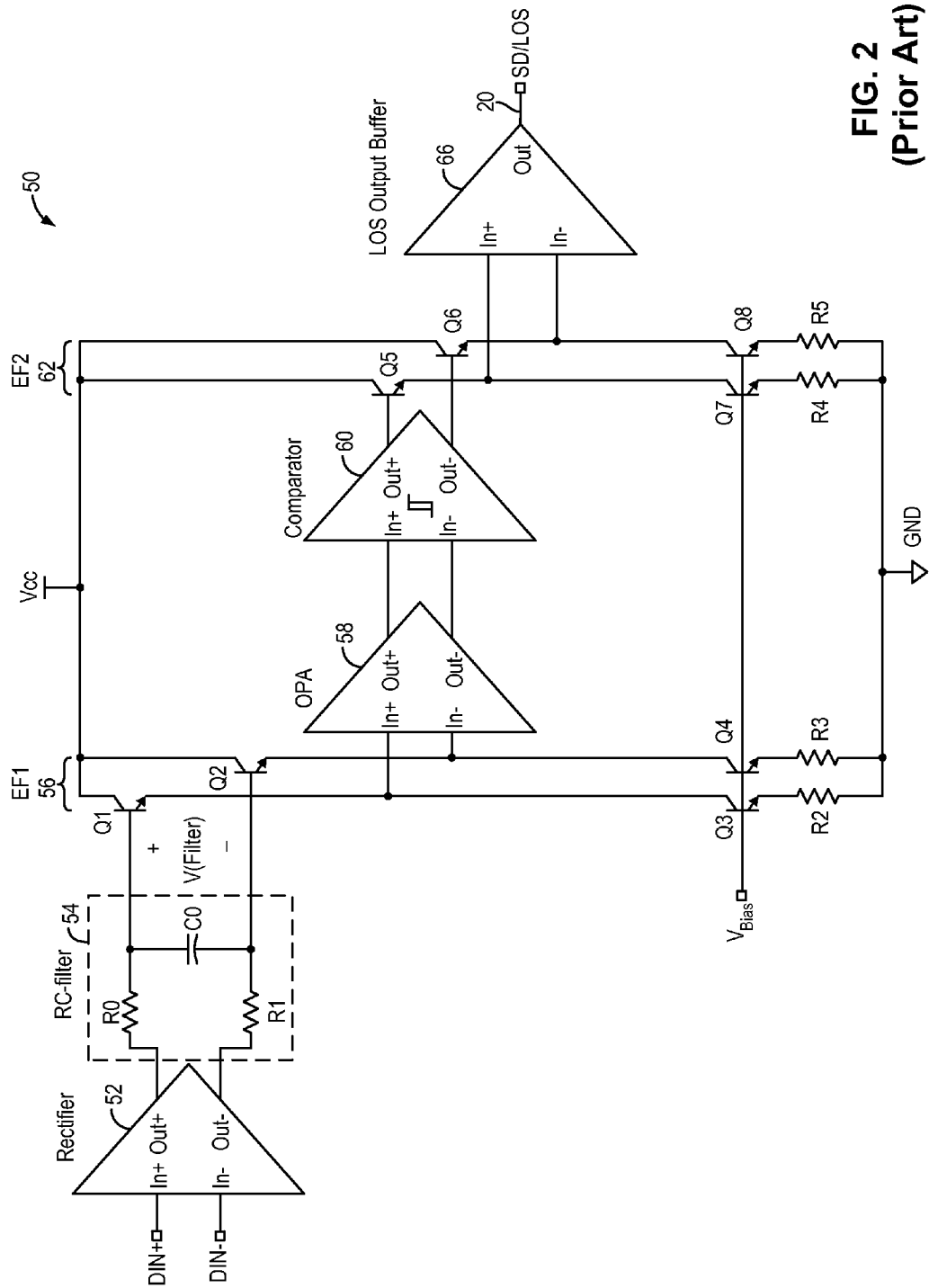
FIG. 2 illustrates a conventional signal level detect circuit that can be used to implement the signal level detect path in a conventional limiting post amplifier.

FIG. 2 illustrates a conventional signal level detect circuit that can be used to implement the signal level detect path in a conventional limiting post amplifier. Referring to FIG. 2, the conventional signal level detect circuit 50 includes a rectifier 52 for receiving the data input signal and to amplify the data input signal. The conventional signal level detect circuit 50 uses an RC-filter 54 in the signal level detect path to smooth out the waveform of the rectified input signal. In the signal level detect circuit 50, the filtered data input signal is then coupled to a first voltage buffer 56 which is implemented as an emitter follower (EF1) in the present example. The first voltage buffer 56 generates a detected signal. The detected signal is coupled to drive an amplifier 58, which is implemented as an operational amplifier OPA in the present example but can be implemented as a variable gain amplifier VGA in other examples. The amplified detected signal of amplifier 58 drives a comparator 60 with hysteresis, which is implemented as a Schmitt-trigger in the present example. The comparator 60 typically provides a digital output signal. The comparator 60 compares the amplified detected signal to a signal level threshold. The output of the comparator is coupled to drive a second voltage buffer 62, which is implemented as an emitter follower (EF2). The second voltage buffer 62 drives an output buffer 66 for generating the SD/LOS signal (node 20).

Figure 5A:
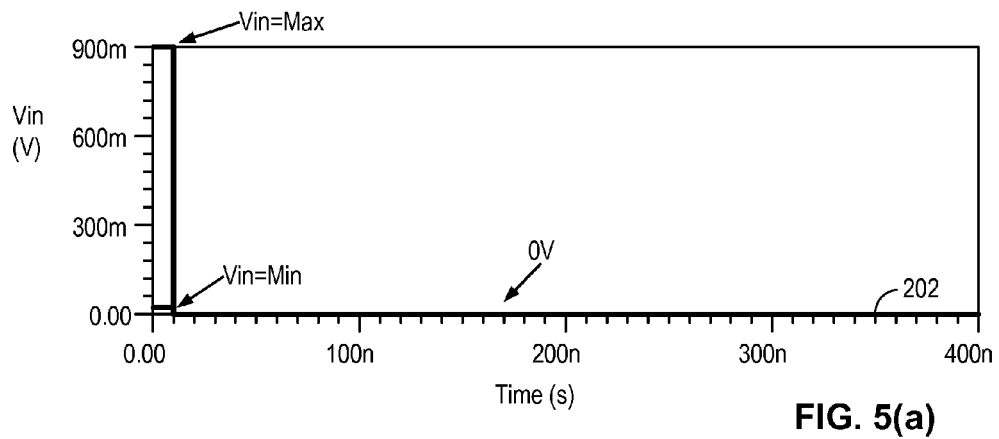
FIGS. 5(a), 5(b) and 5(c) are timing diagrams illustrating the LOS assertion delay time for the conventional signal level detect circuit of FIG. 2 (FIG. 5(b)) and the signal level detect circuit of the present invention in FIGS. 3 and 4 in embodiments of the present invention (FIG. 5(c)).
Figure 5B:
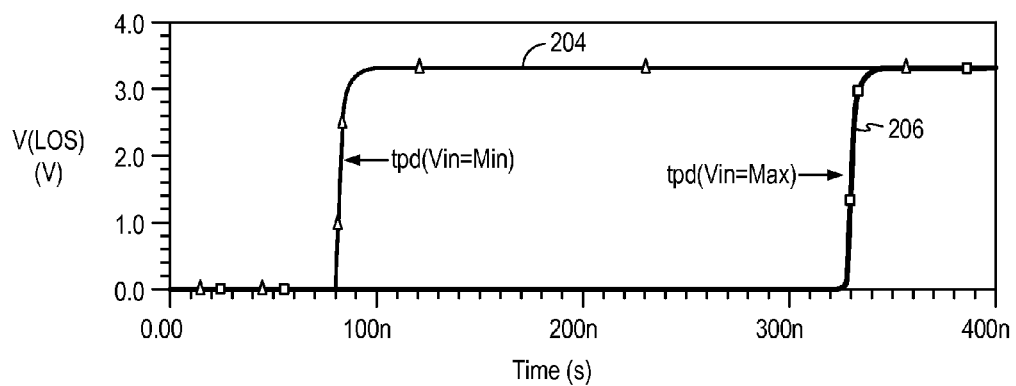

In some applications, the voltage level of the input signal may have a large voltage amplitude while transmitting data and then drops down to zero when the signal transmission is completed, such as when a burst signal has ended. In that case, there is often a delay to assert the LOS signal at the output of the signal level detect circuit. The LOS assertion delay is mainly determined by the time which the RC-filter 54 needs to discharge (with its RC time constant) from the value of the input voltage to the value of the signal level threshold so that the comparator 60 will be triggered and will switch the output state. Because of the RC filter discharge time and because of the wide variation for the input signal amplitude, such as from several mV to several hundreds of mV, the LOS assertion delay time may vary within a wide range. For example, in a PON, typical input signal range could be from less than 5mVpp (peak-to-peak voltage) to greater than 1800 mVpp differential. FIG. 5(a) illustrates the signal waveform 202 of a data input signal transitioning from a valid input voltage level Vin to the end of input voltage level (0V). The valid input voltage level Vin can vary over a wide voltage range, from a maximum Vin value of 900 mV or more to a minimum Vin value of 2.5 mV or less. FIG. 5(b) illustrates the LOS signal assertion delay time in a conventional signal level detect circuit. Waveform 204 represents the assertion of the LOS signal when the input voltage level Vin is at a minimum value and waveform 206 represents the assertion of the LOS signal when the input voltage level Vin is at a maximum value. As can be observed in FIG. 5(b), when the input voltage level Vin is large (waveform 206), there is significant delay in asserting the LOS signal. Furthermore, a large variation in the LOS signal assertion delay time is observed when the input voltage level Vin varies between the minimum value and the maximum value.

In practice, signal level detect circuits that use an RC filter circuit often have a LOS signal assertion delay time in the microsecond range, such as 2 µs to 10 µs. The long LOS signal assertion delay may exceed the timing budget imposed in some applications. For example, in PON applications, the LOS signal assertion delay has to be less than the 512 ns link reset timing budget. A long LOS signal assertion delay may reduce the amount of data payload on the link due to extra link reset events.

Signal Level Detect Circuit

Figure 3:
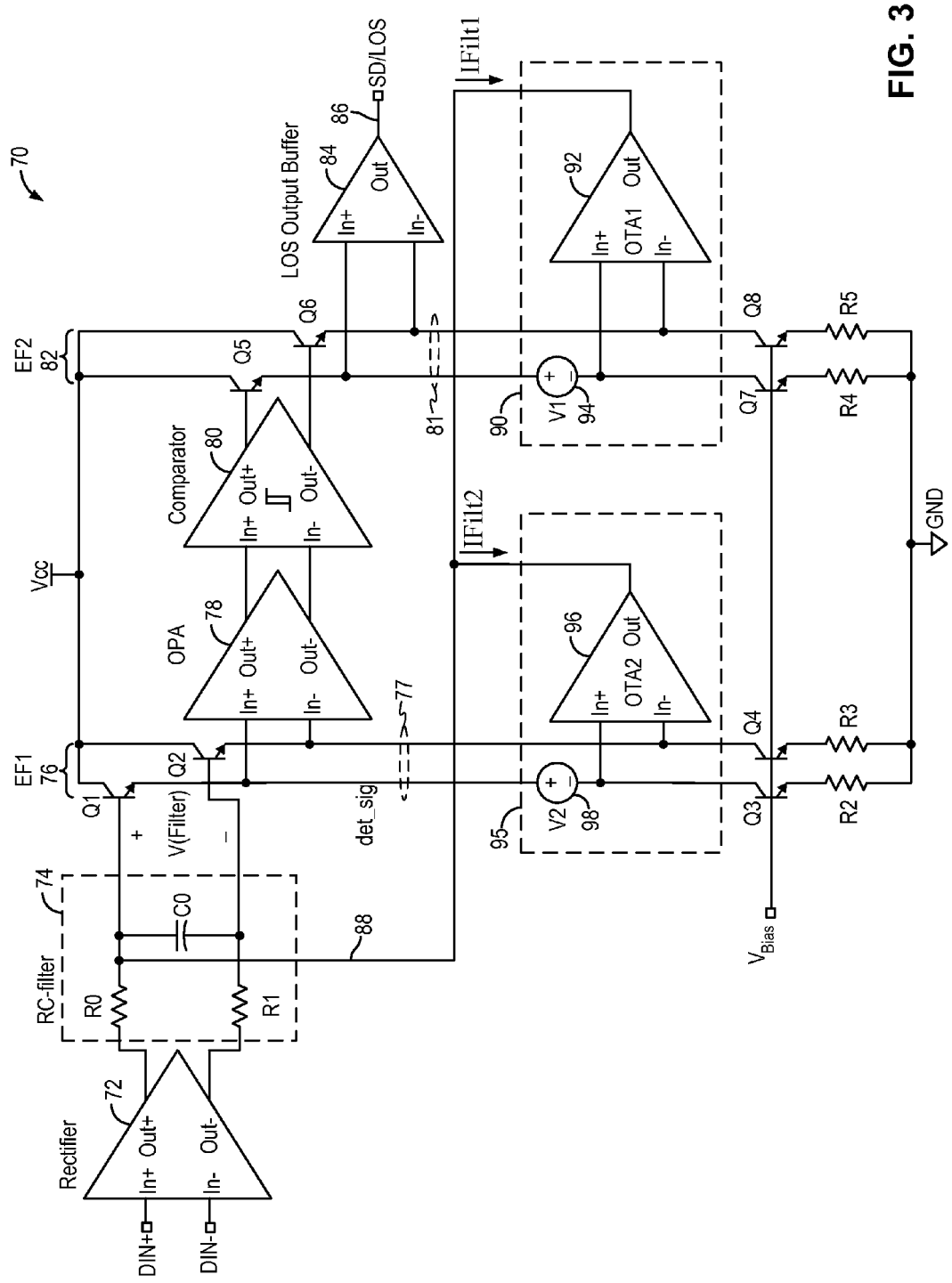
FIG. 3 illustrates a signal level detect circuit for detecting the presence or absence of an input signal in embodiments of the present invention.

FIG. 3 illustrates a signal level detect circuit for detecting the presence or absence of an input signal in embodiments of the present invention. The signal level detect circuit 70 in FIG. 3 is configured to assess an input signal on an input terminal and generate an indicator thereof. In particular, the signal level detect circuit is configured to detect an input signal above a signal level threshold. The indicator can be a loss-of-signal (LOS) signal or a signal detect (SD) signal. The LOS signal and the SD signal are complementary signals. That is, one signal is asserted when the other signal is deasserted. For instance, at the end of the input data signal, the LOS signal is asserted and the SD signal is deasserted. In some embodiments, the signal level detect circuit is incorporated in a limiting post amplifier for use with a burst mode receiver. For example, in one embodiment, the signal level detect circuit of FIG. 3 can be incorporated in the limiting post amplifier of FIG. 1 to implement the signal level detect path. The signal level detect circuit of the present invention implements active discharge of the RC filter circuit to reduce the delay time for asserting the LOS signal (or deasserting the SD signal). The signal level detect circuit with active discharge is effective in reducing the LOS assertion delay time, particularly when the input signal has medium to high signal amplitude levels.

Referring to FIG. 3, the signal level detect circuit 70 includes a rectifier 72 for receiving the data input signal DIN and to amplify or buffer the data input signal. In the present embodiment, the data input signal DIN is a differential signal DIN+/− which may be previously buffered or amplified. The rectifier 72 functions as an amplifier or a buffer in embodiments of the present invention and may be implemented as a buffer or an amplifier. The signal level detect circuit 70 further includes an RC-filter circuit 74 to process the rectified input signal. For instance, the RC-filter circuit 74 may smooth out the waveform of the rectified input signal generated by rectifier 72. In the signal level detect circuit 70, the filtered data input signal, having voltage amplitude of V(Filter), is then coupled to a first voltage buffer 76 which is implemented as an emitter follower (EF1) in the present embodiment. The first voltage buffer 76 generates a detected signal det_sig (node 77). The rectifier 72, the RC-filter circuit 74 and the first voltage buffer functions as an input stage to receive and sample the input signal DIN.

The detected signal is coupled to drive an amplifier 78, which is implemented as an operational amplifier OPA in the present embodiment but can be implemented as a variable gain amplifier VGA in other embodiments. The amplifier output signal drives a comparator 80 which compares the amplified detected signal (the comparator input signal) to a signal level threshold. In one embodiment, the comparator 80 is a comparator with hysteresis and compares the comparator input signal to the signal level threshold where the signal level threshold may be programmable. In some embodiments, the signal level threshold of the comparator 80 is established by circuit elements forming the comparator 80. In another embodiment, the comparator 80 is a Schmitt-trigger which compares the comparator input signal to a fixed threshold level where the fixed threshold level is determined by the circuit elements forming the Schmitt-trigger.

In the present embodiment, the comparator 80 implements an analogue output characteristic around the signal level threshold of the comparator. That is, the comparator 80 implements a gradual transition of the comparator output signal around the signal level threshold or switching point of the comparator. The comparator output signal does not switch from a low logical level to a high logical level in a step transition as the comparator input signal increases. Rather, the comparator 80 has a transfer characteristic that changes from a low output state (less than 0V) to a high output state (greater than 0V) gradually with a small step transition at the signal level threshold. An example of the transfer characteristics for comparator 80 is shown in FIG. 8(*a*). As shown in FIG. 8(*a*), as the comparator input signal increases from 0V to the signal level threshold (for example, 3 mV), the comparator output signal is initially at the low output state (less than 0V) and starts to increase gradually, for example, from about −300 mV to about −70 mV. When the comparator input signal is at the signal level threshold (e.g., 3 mV), the comparator output signal changes from the low output state (about −70 mV) to the high output state (about +250 mV). Then, as the comparator input voltage continues to increase, the comparator output signal gradually increases from 250 mV to the limiting value of 400 mV. The gradual transition of the comparator output signal before and after the signal level transition is referred to as the analogue output characteristic of the comparator.

The comparator output signal of the comparator 80 is coupled to drive a second voltage buffer 82, which is implemented as an emitter follower (EF2). The second voltage buffer 82 generates an amplified comparator output signal (node 81) which is coupled to drive an output buffer 84 for generating the LOS or SD signal (node 86). In some embodiments, a user selection input determines whether the output buffer provides a LOS signal or a SD signal as output signal. The output buffer 84 generates the LOS or SD signal having digital signal levels, as shown in FIG. 8(*b*). That is, the output buffer 84 generates the LOS or SD signal that switches between a low logical state and a high logical state.

As thus configured, the input signal DIN is received by the rectifier 72 and is filtered by the RC-filter circuit 74. After buffering and amplification by the first voltage buffer 76 and the amplifier 78, the amplified detected signal is compared with the signal level threshold at the comparator 80. As the amplified detect signal (the comparator input signal) increases in amplitude, the comparator output signal gradually increases from the low output state (less than 0V). The output buffer 84 asserts the SD signal or deasserts the LOS signal (node 86) in response to the comparator output signal increases to the high output state (greater than 0V). In the present example, a logical high output at the output buffer 84 indicates detection of an input signal, that is, assertion of the SD signal or deassertion of the LOS signal. When the comparator input signal is less than (or becomes less than) the signal level threshold, the comparator output signal is at the low output state and the output buffer 84 deasserts the SD signal or asserts the LOS signal. In that case, a logical low output at the output buffer 84 indicates the absence of an input signal, that is, deassertion of the SD signal or assertion of the LOS signal.

In some embodiments, the rectifier 72, the RC-filter circuit 74 and the voltage buffer EF1 76 form the level detect circuit 24 in the signal level detect path of the limiting amplifier 10 of FIG. 1. Meanwhile, the amplifier 78, the comparator 80, the voltage buffer EF2 82 and the output buffer 84 form the comparator with hysteresis 26 in the signal level detect path of the limiting amplifier 10 of FIG. 1.

In some embodiments, the signal level threshold voltage value is programmable. The programmable signal level threshold can be implemented by using a comparator with hysteresis and adjusting the threshold input value to the comparator. In other embodiments, when the comparator 80 is implemented as a Schmitt trigger, the Schmitt trigger has a fixed threshold level. In that case, the programmable signal level threshold can be set through the amplifier 78 preceding the Schmitt trigger comparator 80. In that case, the amplifier 78 is a variable gain amplifier where the gain of the amplifier is adjusted according to the programmable signal level threshold. Alternately, in some embodiments, when the signal level threshold is a fixed value. The amplifier 78 preceding the comparator can be a fixed gain amplifier.

The signal level detect circuit 70 of the present invention implements active discharge of the RC-filter node to reduce the delay time for asserting the LOS signal. In embodiments of the present invention, the signal level detect circuit 70 includes an active discharge circuit including a first discharge circuit 90 and a second discharge circuit 95. The first discharge circuit 90 includes an operational transconductance amplifier 92 or OTA1 for generating a first discharge current (IFilt1) coupled to discharge a filter node 88 of the RC-filter circuit 74. Specifically, the first discharge current IFilt1 is coupled to the top plate of the capacitor C0 in the RC-filter circuit 74 receiving the positive output signal from the rectifier 72. Operational amplifier OTA1 is controlled by the differential output signal of the comparator 80 where the comparator output signal may be buffered by the second voltage buffer 82. That is, in the present example, the operational amplifier OTA1 is controlled by the amplified comparator output signal (node 81). Operational amplifier OTA1 generates the first discharge current IFilt1 in response to transitions of the comparator output signal. In the present embodiment, operational amplifier OTA1 senses the comparator output signal (or the amplified comparator output signal) and sinks the first discharge current IFilt1 when the comparator output signal changes to the high output state.

More specifically, when the comparator output signal is at a low output state (less than 0V), that is when the input signal DIN is less than the signal level threshold, the operational amplifier OTA1 is turned off and does not sink any current at its output terminal. That is, the first discharge current IFilt1 is zero, as shown in FIG. 8(*d*). Then, when the comparator output signal increases to a high output state (greater than 0V), that is when the input signal DIN is greater than the signal level threshold, the operational amplifier OTA1 is turned on to sink the first discharge current IFilt1 at its output terminal, as shown in FIG. 8(*d*). In this manner, the first discharge current IFilt1 operates to discharge the RC-filter node 88 whenever the input signal DIN is greater than the signal level threshold. When the input signal DIN goes to zero voltage and the RC-filter circuit 74 has to be discharged to trigger the comparator 80, the delay time to trigger the comparator 80 is reduced as the RC-filter circuit 74 has already been actively discharged by the first discharge current IFilt1. Furthermore, the first discharge current IFilt1 also operates to lower the filter voltage V(Filter) at the RC-filter circuit 74 which reduces the discharge time further. More specifically, the first discharge current IFilt1 reduces the filter voltage V(Filter) by R0×IFilt1, where R0 is the resistance of the resistor in the RC-filter circuit 74.

In some embodiments, an offset voltage is introduced to the operational amplifier OTA1 so that operational amplifier OTA1 is turned off and does not sink any current around the transition point or trigger point of the comparator 80. In this manner, the first discharge circuit 90 does not interfere with the normal operation of the signal level detect circuit 70 in detecting the signal level of the input signal. In the present embodiment, an offset voltage V1 is applied to the positive input terminal of operational amplifier OTA1. In FIG. 3, a voltage source 94 is used to introduce the offset voltage V1 at the positive input terminal of operational amplifier OTA1. In effect, the offset voltage V1 operates in conjunction with the transfer characteristics of the comparator 80 to generate an offset margin to the signal level threshold of the comparator 80 as seen by the input of the operational amplifier OTA1. In one example, the offset voltage V1 is 300 mV and an offset margin of 0.4 mV is realized so that the signal level threshold of the comparator 80, as sheen by the operational amplifier OTA1, is effectively shifted to 3.4 mV. FIG. 8(*c*) illustrates the signal waveform of the input signal to the operational amplifier OTA1 which is the comparator output signal with the offset margin (0.4 mV) introduced to the signal level threshold. The transition of the comparator output signal from the low output state to the high output state is shifted from 3 mV to 3.4 mV. Accordingly, the offset margin is introduced to cause the operational amplifier OTA1 to activate a given offset after the comparator 80 is triggered on the detection of an input signal exceeding the signal level threshold. That is, the operational amplifier OTA 1 starts to sink the current IFilt1 when the comparator input signal has a voltage value of the signal level threshold plus the offset margin (e.g. 3.4 mV), as shown in FIG. 8(*d*).

In embodiments of the present invention, the signal level detect circuit 70 further includes a second discharge circuit 95 configured to clamp the filter voltage V(Filter) (node 88) of the RC-filter circuit 74. The second discharge circuit 95 includes an operational amplifier 96 or OTA2. The operational amplifier OTA2 is controlled by the detected signal det_sig (node 77), being the voltage drop of the rectified voltage over the filter resistors R0 and R1 that is buffered by the voltage buffer EF1. A reference voltage V2 is applied to the positive input terminal of the operational amplifier OTA2 to offset the differential input signals to the operational amplifier OTA2. As thus configured, when the detected signal (node 77) at voltage buffer EF1 exceeds the reference voltage V2, the operational amplifier OTA2 is turned on to sink a second discharge current (IFilt2) which is coupled to the RC filter node 88 being the top plate of the capacitor C0. In this manner, the filter voltage V(Filter) is clamped to the reference voltage V2. In FIG. 3, a voltage source 98 denotes the reference voltage V2 coupled to the positive input terminal of operational amplifier OTA2.

As a whole, the active discharge circuit including the first discharge circuit 90 and the second discharge circuit 95 operates as follows. At the first discharge circuit 90, the operational amplifier OTA1 is controlled by the comparator output signal of the comparator 80 (or the amplified comparator output signal on node 81) which is offset by the offset margin related to the offset voltage V1 and the transfer characteristic of the comparator 80. The operational amplifier OTA1 generates the first discharge current IFilt1 in open loop. In particular, the operational amplifier OTA1 sinks the first discharge current IFilt1 after the comparator output signal is triggered in response to the detection of an input signal greater than the signal level threshold plus the offset margin (as shown in FIG. 8(*d*)).

Meanwhile, at the second discharge circuit 95, the operational amplifier OTA2 is controlled by the detected signal det_sig (node 77) from the RC-filter circuit 74 and the first voltage buffer 76 which is offset by the reference voltage V2. The operational amplifier OTA2 generates the second discharge current IFilt2 in close loop. In particular, the operational amplifier OTA2 sinks the second discharge current IFilt2 when the filter voltage V(Filter) exceeds the reference voltage V2.

In one embodiment, both OTA1 and OTA2 have only sink capability and no source capability. When the data input signal DIN has a low voltage level, lower than the signal level threshold, both OTA1 and OTA2 are turned off and no active discharge current (IFilt1 or IFILT2) is supplied. When the data input signal DIN exceeds the signal level threshold of comparator 80 by the offset voltage V1, operational amplifier OTA1 is activated and sinks the first discharge current IFilt1 from the RC-filter node 88. Then, when the data input signal DIN exceeds the reference voltage V2, operational amplifier OTA2 is activated and sinks an additional second discharge current IFilt2 from the RC-filter node 88. In this manner, an active discharge current (current IFilt1) is provided when the input signal exceeds the detection threshold plus the offset margin and the active discharge current keep the filter voltage V(Filter) at the RC-filter circuit 74 low so that the RC-filter can be discharged quickly when needed. When the input signal becomes very large, the operational amplifier OTA2 is turned on to increase the active discharge current (additional current IFilt2) so that the filter voltage V(Filter) is clamped to the reference voltage V2. As thus configured, the delay time to assertion of the LOS signal is predictable and does not vary widely with the input signal level as the RC filter voltage is clamped to a maximum voltage for input signal level greater than certain level.

Figure 4:
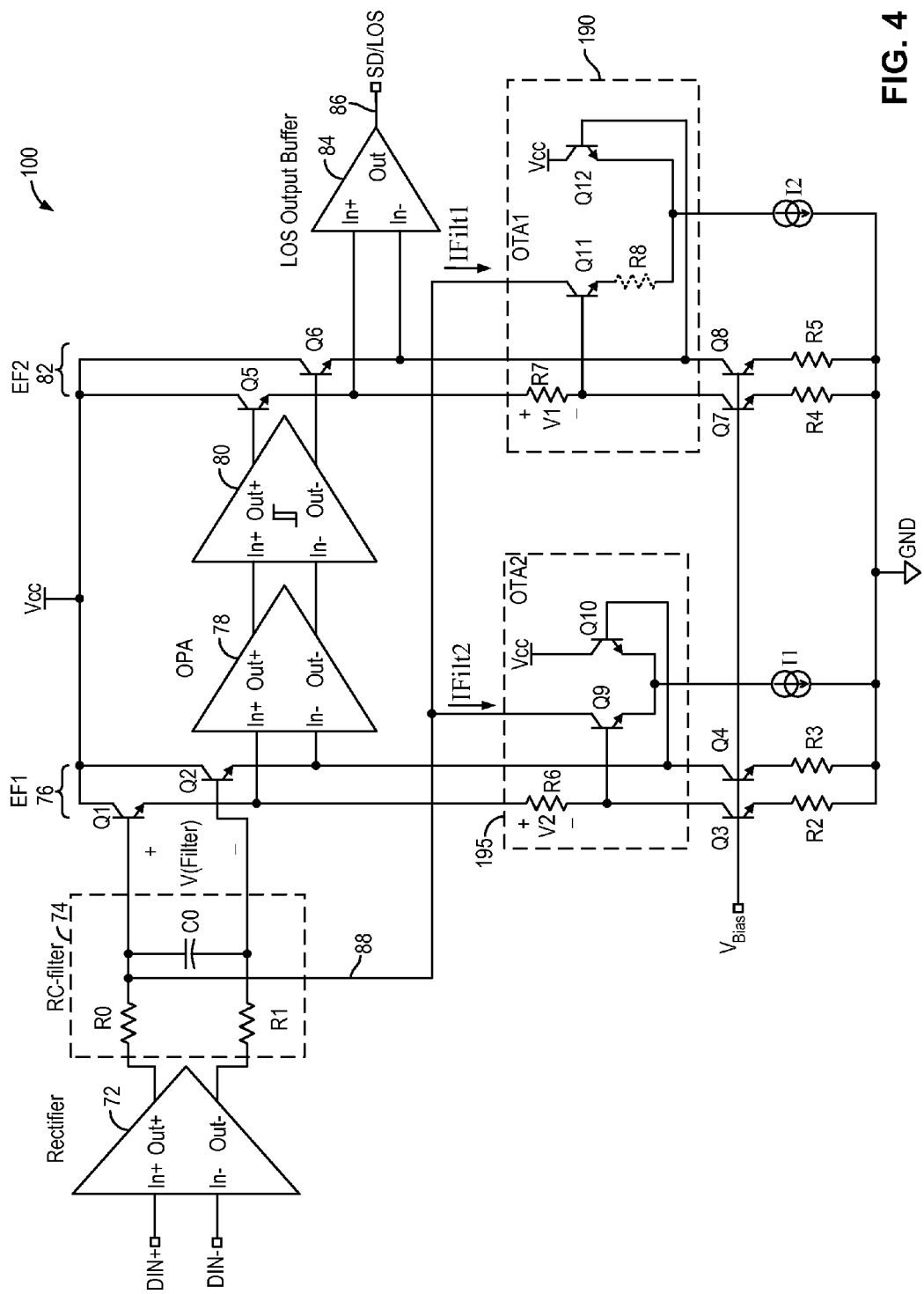
FIG. 4 is a transistor level implementation of the signal level detect circuit of FIG. 3.

FIG. 4 is a transistor level implementation of the signal level detect circuit of FIG. 3. In the embodiment shown in FIG. 4, both OTA1 and OTA2 are configured as differential gain stages. Voltages V1 and V2 are generated by a voltage drop over a resistor. In particular, voltage V1 is generated by a voltage drop across a resistor R7 and is a function of the current of the second voltage buffer EF2. That is, V1=R7×I (EF2), where I(EF2) is the current flowing between transistor Q5 and Q7 of the voltage buffer EF2. On the other hand, voltage V2 is generated by a voltage drop across a resistor R6 and is a function of the current of the first voltage buffer EF1. That is, V2=R6×I(EF1), where I(EF1) is the current flowing between transistor Q1 and Q3 of the voltage buffer EF1. In some embodiments, a resistor R8 can be connected to the emitter of transistor Q11 of the operational amplifier OTA1 to vary the transconductance of the operational amplifier. Furthermore, in some embodiments, a resistor can be added to the emitter of transistor Q9 to lower the loop gain associated with operational amplifier OTA2.

In the present description, the "delay time" described above is referred to as the LOS assertion delay time. More specifically, the delay time refers to the time when the input signal has ended to the assertion of the LOS signal or the deassertion of the SD signal. It is understood that LOS assertion delay time is equivalent to SD deassertion delay time. The assertion and deassertion of the LOS signal correspond in opposite to the assertion and deassertion of the SD signal and either signal can be used as an indicator of the presence or absence of an input signal in embodiments of the present invention. The use of an LOS assertion delay time is illustrative only and is not intended to be limiting.

Figure 5C:
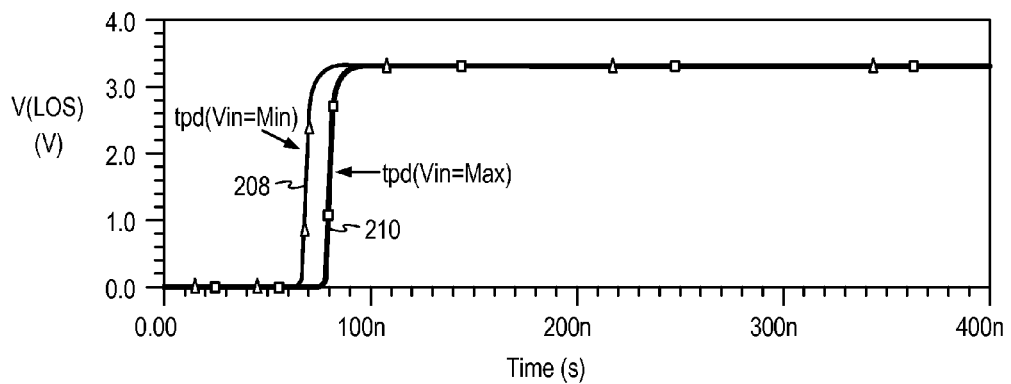

FIGS. 5(*a*), 5(*b*) and 5(*c*) are timing diagrams illustrating the LOS assertion delay time for the conventional signal level detect circuit of FIG. 2 (FIG. 5(*b*)) and the signal level detect circuit of the present invention in FIGS. 3 and 4 in embodiments of the present invention (FIG. 5(*c*)). As described above, in the conventional signal level detect circuit, there is a large variation in the LOS assertion delay time when the input signal amplitude varies over a wide range, as illustrated by the delay time difference between curves 204 and 206 in FIG. 5(*b*). However, when the signal level detect circuit of the present invention with active discharge is used, a reduction in the LOS assertion delay time is realized as well as a reduction in the delay time variation as shown by curves 208 and 210 in FIG. 5(*c*). In some embodiments, with the active discharge circuit thus configured, the LOS assertion time delay is reduced to a consistent level, such as between 70 ns to 120 ns range with the data input signal variations from 5 mVpp to 1800 mVpp (differential).

Figure 6A:
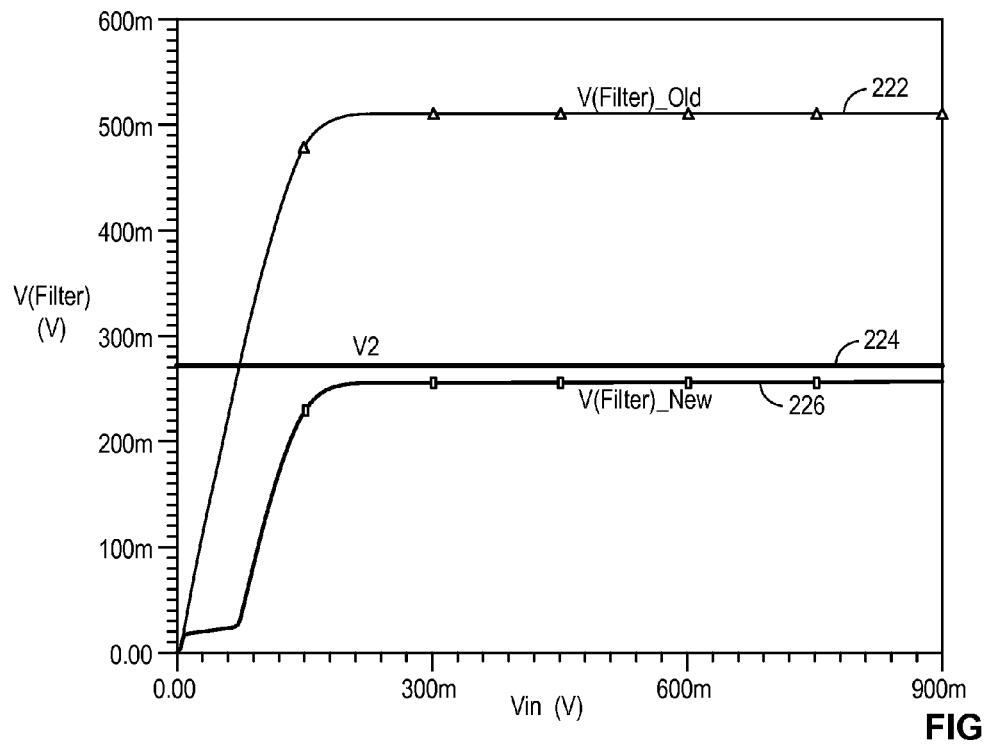
FIG. 6(a) illustrates the voltage level of the filter voltage V(Filter) as a function of the input voltage amplitude using the conventional signal level detect circuit and using the signal level detect circuit of the present invention.
Figure 6B:
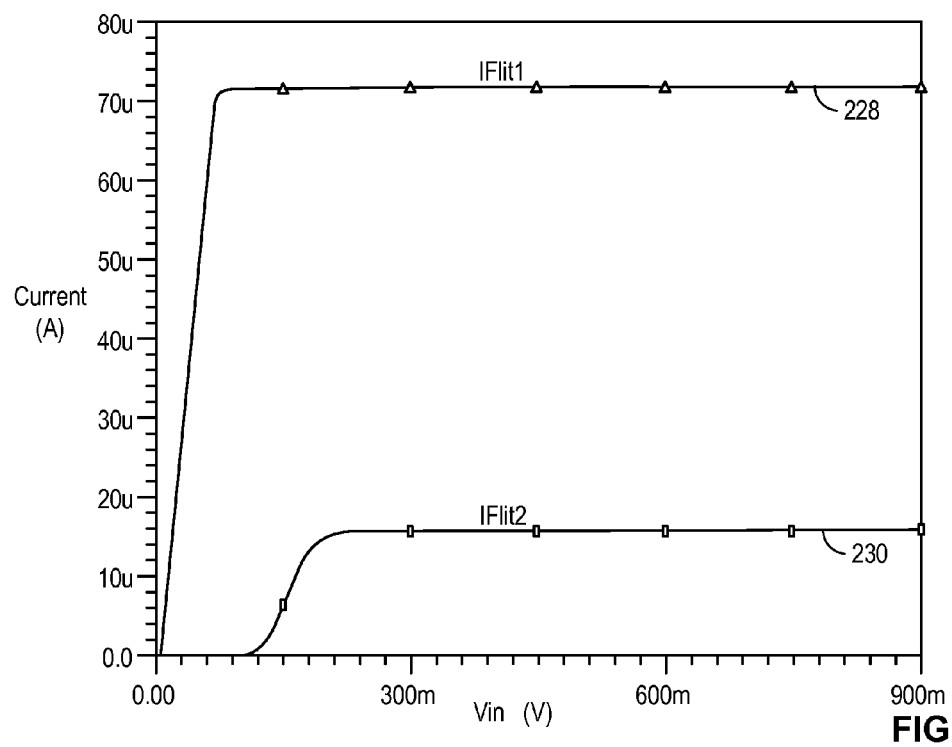
FIG. 6(b) illustrates the current value of the first and second discharge currents (IFilt1 and IFilt2) as a function of the input voltage amplitude.

FIG. 6(*a*) illustrates the voltage level of the filter voltage V(Filter) as a function of the input voltage amplitude using the conventional signal level detect circuit and using the signal level detect circuit of the present invention. In the conventional signal level detect circuit, the filter voltage V(Filter) _Old (curve 222) increases to a large voltage value for medium to high input voltage values Vin. However, when the signal level detect circuit of the present invention is used, the filter voltage V(Filter)_New (curve 226) is clamped to no greater than the reference voltage V2 (curve 224) even when the input voltage Vin becomes large. Even for medium input voltage values, the filter voltage V(Filter)_New is lower than the filter voltage V(Filter)_Old for the conventional circuit due to the first active discharge current IFilt1. The reduced filter voltage helps to reduce the delay time to assert the LOS signal. FIG. 6(*b*) illustrates the current value of the first and second discharge currents (IFilt1 and IFilt2) as a function of the input voltage amplitude. As can be observed in FIG. 6(*b*), the first discharge current IFilt1 (curve 228) is activated quickly after the input signal exceeds the signal level threshold plus the offset margin, which depends on the offset voltage V1 and the transfer characteristic of the comparator. The second discharge current IFilt2 (curve 230) is activated later on when the input signal exceeds the reference voltage V2.

Figure 7A:
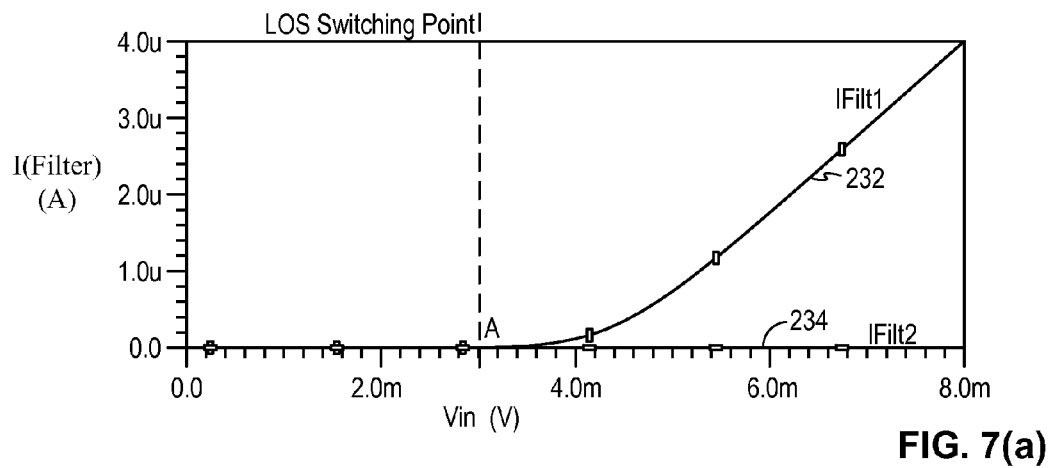
FIGS. 7(a) to 7(c) illustrate the active discharge current, the filter voltage and the LOS signal as a function of the input voltage amplitude using the conventional signal level detect circuit and using the signal level detect circuit of the present invention.
Figure 7B:
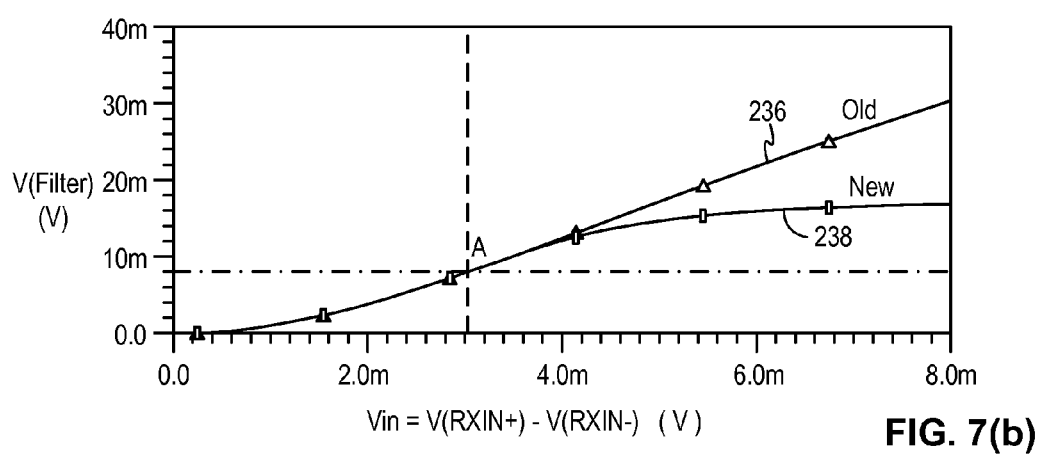
Figure 7C:
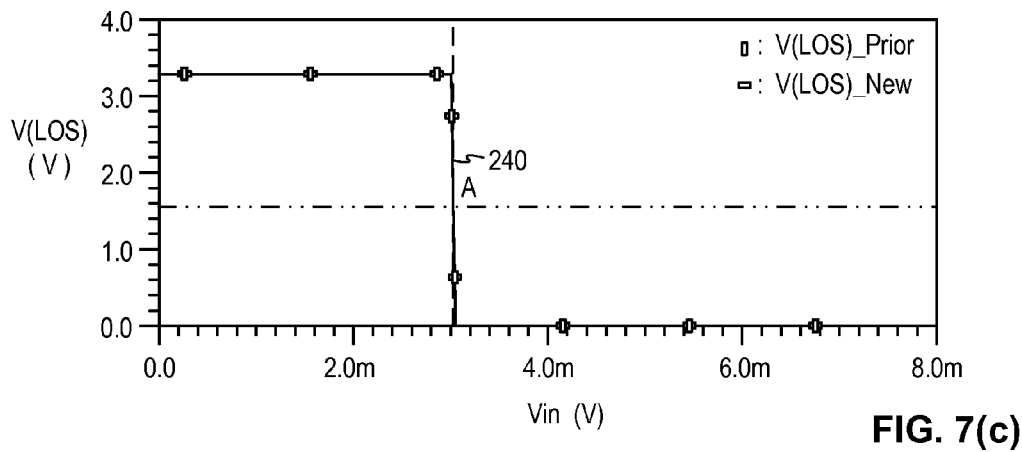
Figure 8B:
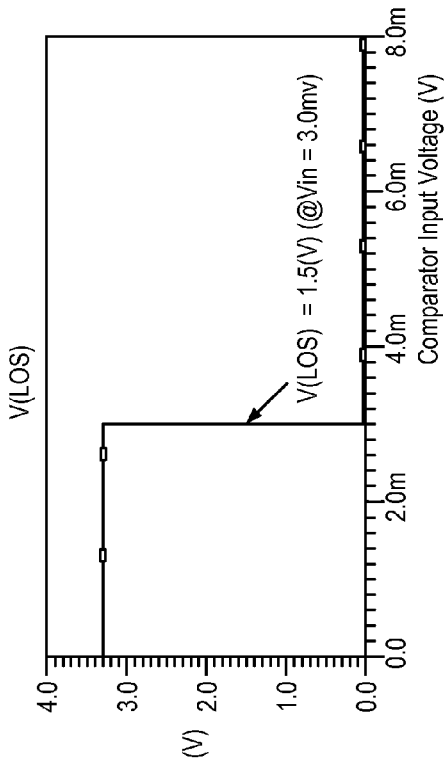
FIG. 8(b) illustrates the LOS signal in response to the comparator output signal of FIG. 8(a).
Figure 8D:
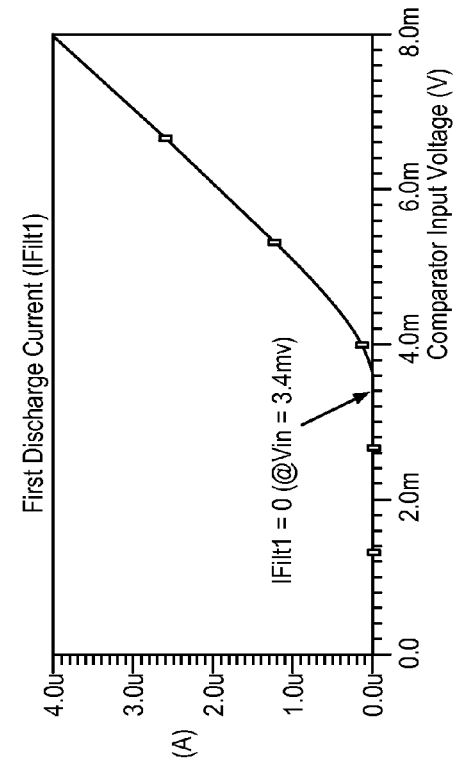
FIG. 8(d) illustrates the active discharge current IFilt1 in response to the comparator output signal of FIG. 8(a).
Figure 8A:
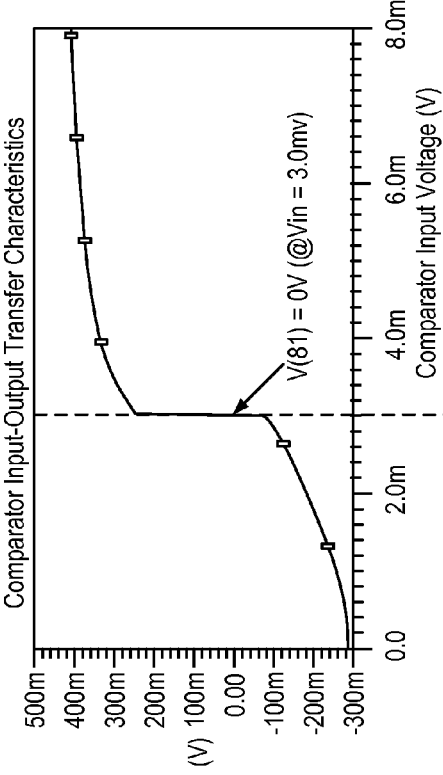
FIG. 8(a) illustrates an example of the transfer characteristic of the comparator output signal of the comparator in the signal level detect circuit of FIG. 3.
Figure 8C:
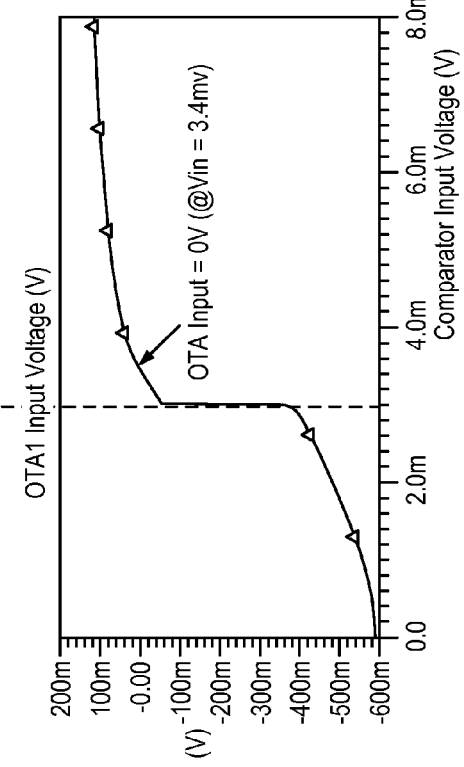
FIG. 8(c) illustrates the input signal to the first discharge circuit which is the comparator output signal of FIG. 8(a) with an offset margin applied.

FIGS. 7(*a*) to 7(*c*) illustrate the active discharge current, the filter voltage and the LOS signal as a function of the input voltage amplitude using the conventional signal level detect circuit and using the signal level detect circuit of the present invention. When the input signal is lower than the signal level threshold (denoted "A") plus an offset, no active discharge current is applied as shown in FIG. 7(*a*). That is, both the first and second discharge currents IFilt1 and IFilt2 (curves 232 and 234) are zero for input voltage level Vin lower than A plus an offset margin. Thus, no active discharge current is applied around the transition point or trigger point of the comparator. As shown in FIG. 7(*b*), the filter voltage V(Filter) of the inventive signal level detect circuit (curve 238) tracks the filter voltage V(Filter) of the conventional signal level detect circuit (curve 236) in the low input voltage region. Below the switching point A, the LOS signal is asserted (logical high), as shown in by curve 240 in FIG. 7(*c*).

However, as the input voltage level increases beyond the switching point A plus the offset margin, the first discharge current IFilt1 (curve 232) increases to initiate the active discharge of the RC-filter node. The filter voltage V(Filter) of the inventive signal level detect circuit (curve 238) becomes lowered than the filter voltage V(Filter) of the conventional signal level detect circuit (curve 236) due to the active discharge current IFilt1 being applied to discharge the RC-filter node. However, the LOS signal assertion as a function of the input signal Vin is not changed with the use of the active discharge circuit. The LOS signal (curve 240) is still asserted or deasserted at the same signal level threshold (A). Above the switching point A, the LOS signal is deasserted (logical low), as shown in by curve 240 in FIG. 7(*c*). Meanwhile, the delay time to assert the LOS signal is decreased as shown in FIG. 5(*c*).

Alternate Embodiments

In the above described embodiments, the active discharge circuit includes a first discharge circuit to generate a first discharge current when the input signal detection is triggered and a second discharge circuit to generate a second discharge current to clamp the input signal at a given reference voltage. In other embodiments of the present invention, the active discharge circuit may be configured to include only the first discharge circuit. The second discharge circuit to clamp the input signal voltage level may be omitted in other embodiments of the present invention.

In the above described embodiments, the signal level detect circuit is configured using differential signaling. In embodiments of the present invention, the signals in the signal level detect circuit may be single-ended or differential signals.

Also, in the above described embodiments, the operational amplifiers OTA1 and OTA2 are configured with current sink capability only at the output terminal. In other embodiments, the operational amplifiers OTA1 and OTA2 can be configured with source or sink capability. Furthermore, the operational amplifiers OTA1 and OTA2 can be configured with single-ended or differential source or sink capability.

In the above-described embodiments, the operational amplifiers OTA1 and OTA2 have sink capability only and are coupled to the top plate of the capacitor C0 in the RC-filter circuit to discharge the filter node. In some embodiments, the operational amplifiers OTA1 and OTA2 have source capability only and are coupled to source current to the bottom plate of the capacitor C0 in the RC-filter circuit.

In some embodiments, the signal level detect circuit may be configured with multiple filter stages. In that case, the active discharge circuit may be configured with multiple discharge circuits to provide active discharge currents to each of the filter stages.

In the above described embodiments, the offset voltage V1 and the reference voltage V2 are fixed voltage values. In other embodiments, the voltages V1 and V2 are variable voltage values. In one embodiment, voltages V1 and V2 are configured as a function of the signal level threshold to which the data input signal is compared.

In the above described embodiments, the voltage buffers EF1 and EF2 are implemented as emitter followers using NPN bipolar transistors. In other embodiments, the voltage buffers EF1 and EF2 can be implemented using NPN bipolar transistors or PNP bipolar transistors.

In the above-described embodiments, the voltage buffers EF1 and EF2 are implemented using bipolar transistors and in FIG. 4, OTA1 and OTA2 are shown as being implemented using bipolar transistors. FIGS. 3 and 4 are illustrative only and are not intended to be limiting. In other embodiments, the signal level detect circuit can be implemented using CMOS transistors. Furthermore, in other embodiments, the signal level detect circuit is fabricated as a semiconductor integrated circuit, either as a standalone IC or as part of another integrated circuit. The signal level detect circuit can be fabricated using any semiconductor technologies presently known or to be developed, such as bipolar, CMOS or BiCMOS fabrication processes In embodiments of the present invention, the signal level detect circuit can be incorporated in a limiting post amplifier for use with a burst mode receiver. For example, the signal level detect circuit can be incorporated in a receiver for PON applications. The signal level detect circuit can be incorporated in an OLT deployed at the service provider's central office or incorporated in an ONT/ONU deployed at user premises. Furthermore, in other embodiments, the signal level detect circuit can be applied in a receiver for receiving burst mode signals or continuous mode signals.

Advantages

The signal level detect circuit of the present invention provides many advantages over conventional signal level detect circuits. First, the signal level detect circuit of the present invention realizes significant LOS assert or SD deassert delay time reduction for medium amplitude (10 s of mVpp) to high (100 s of mVpp) input signals without affecting the normal operation of the signal level detect path around the LOS threshold levels for low (<10 s of mVpp) input signals. Second, the signal level detect circuit incorporating active discharge can be applied in other applications having low time delay requirements for LOS assert or SD deassert types of signals.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A signal level detect circuit configured to assess an input signal with varying amplitude signal levels on an input terminal and to generate an indicator signal indicative of the presence and absence of a valid signal at the input terminal, the signal level detect circuit comprising:

an input circuit configured to receive the input signal and to process the input signal, the input circuit comprising a first node on which the input signal is sampled;

a comparator configured to receive the sampled input signal as a comparator input signal and to compare the sampled input signal to a signal level threshold where an amplitude level of the comparator input signal being above the signal level threshold is indicative of the valid signal and the amplitude level of the comparator input signal being below the signal level threshold is indicative of an invalid signal, the comparator generating a comparator output signal, wherein the valid signal is a data signal having a logical low state and a logical high state, and the invalid signal is not a data signal and does not have a logical low or logical high state;

an output circuit configured to receive the comparator output signal and to generate the indicator signal having a first logical level indicating the presence of the valid signal at the input terminal and having a second logical level indicating the absence of the valid signal at the input terminal; and an active discharge circuit configured to provide a first discharge current to the first node in response to the comparator output signal, wherein the comparator output signal changes from a low output state to a high output state in response to the comparator input signal having an amplitude level above the signal level threshold, and the active discharge circuit generates the first discharge current to discharge the sampled input signal on the first node in response to the comparator output signal changing to the high output state indicating the detection of the presence of the valid signal at the input terminal.

2. The signal level detect circuit of claim 1, wherein the comparator output signal has an analogue output characteristic comprising a step transition in response to the comparator input signal being at the signal level threshold and a sloped transition from the low output state to the high output state outside the step transition.

3. The signal level detect circuit of claim 1, wherein the active discharge circuit generates the first discharge current in response to the comparator input signal having an amplitude level above the signal level threshold plus a positive, non-zero offset margin.

4. The signal level detect circuit of claim 1, wherein the active discharge circuit is further configured to provide a second discharge current to the first node in response to the sampled input signal having an amplitude level at or above a reference voltage, the second discharge current being provided to discharge the sampled input signal on the first node to clamp the amplitude level of the sampled input signal to the reference voltage.

5. The signal level detect circuit of claim 4, wherein the active discharge circuit generates the first and second discharge currents as sinking currents.

6. The signal level detect circuit of claim 5, wherein the input circuit comprises:
   a rectifier configured to receive and amplify the input signal; and
   a RC filter circuit configured to filter the amplified input signal, the RC filter circuit comprising a resistor and a capacitor,
   wherein the first and second discharge currents sink current out of the first node being the top plate of the capacitor.

7. The signal level detect circuit of claim 4, wherein the active discharge circuit generates the first and second discharge currents as sourcing currents to the first node.

8. The signal level detect circuit of claim 7, wherein the input circuit comprises:
   a rectifier configured to receive and amplify the input signal; and
   a RC filter circuit configured to filter the amplified input signal, the RC filter circuit comprising a resistor and a capacitor,
   wherein the first and second discharge currents source current to the first node being the bottom plate of the capacitor.

9. The signal level detect circuit of claim 1, wherein the active discharge circuit comprises:
   a first voltage source configured to introduce an offset voltage to the comparator output signal, the offset voltage being applied to the comparator output signal to introduce a positive, nonzero offset margin to the signal level threshold of the comparator; and
   a first operational amplifier having an input terminal configured to receive the offset-added comparator output signal and an output terminal generating the first discharge current,
   wherein the first operational amplifier generates the first discharge current in response to the comparator output signal changing from the low output state to the high output state in response to the input signal exceeding the signal level threshold plus the positive, nonzero offset margin.

10. The signal level detect circuit of claim 4, wherein the active discharge circuit comprises:
    a first voltage source configured to introduce an offset voltage to the comparator output signal, the offset voltage being applied to the comparator output signal to introduce a positive, nonzero offset margin to the signal level threshold of the comparator;
    a first operational amplifier having an input terminal configured to receive the offset-added comparator output signal and an output terminal generating the first discharge current, wherein the first operational amplifier generates the first discharge current in response to the comparator output signal changing from the low output state to the high output state in response to the input signal exceeding the signal level threshold plus the positive, nonzero offset margin;
    a second voltage source configured to introduce the reference voltage to the sampled input signal; and
    a second operational amplifier having an input terminal configured to receive the reference-voltage-added sampled input signal and an output terminal generating the second discharge current, wherein the second operational amplifier generates the second discharge current in response to the sampled input signal having an amplitude level at or above the reference voltage.

11. The signal level detect circuit of claim 10, wherein the first voltage source comprises a first resistor and the second voltage source comprises a second resistor.

12. The signal level detect circuit of claim 10, wherein the first and second operation amplifier comprise differential operational amplifiers.

13. A method to access an input signal with varying amplitude signal levels on an input terminal and to generate an indicator signal indicative of the presence and absence of a valid signal at the input terminal, the method comprising:
    sampling the input signal into a first node;
    comparing the sampled input signal to a signal level threshold where an amplitude level of the sampled input signal being above the signal level threshold is indicative of the valid signal and the amplitude level of the comparator input signal being below the signal level threshold is indicative of an invalid signal, wherein the valid signal is a data signal having a logical low state and a logical high state, and the invalid signal is not a data signal and does not have a logical low or logical high state;
    changing a comparator output signal from a low output state to a high output state in response to the sampled input signal having an amplitude level above the signal level threshold;
    generating the indicator signal in response to the comparator output signal, the indicator signal having a first logical level indicating the presence of the valid signal at the input terminal and having a second logical level indicating the absence of the valid signal at the input terminal; and
    providing a first discharge current to the first node to discharge the sampled input signal after the comparator output signal changes to the high output state indicating the detection of the presence of the valid signal at the input terminal.

14. The method of claim 13, further comprising:
    detecting the sampled input signal having an amplitude level at or above a reference voltage; and
    providing a second discharge current to the first node to discharge the sampled input signal and to clamp the amplitude level of the sampled input signal to the reference voltage in response to the detecting.

15. The method of claim 13, wherein comparing the sampled input signal to a signal level threshold comprises comparing the sampled input signal to a signal level threshold plus a positive, non-zero offset margin.

16. The method of claim 13, wherein providing a first discharge current to the first node to discharge the sampled input signal comprises providing a sinking current as the first discharge current to the first node to discharge the sampled input signal.

17. The method of claim 14, wherein providing a second discharge current to the first node to discharge the sampled input signal comprises providing a sinking current as the second discharge current to the first node to discharge the sampled input signal.

18. The method of claim 13, wherein providing a first discharge current to the first node to discharge the sampled input signal comprises providing a sourcing current as the first discharge current to the first node to cause the first node to be discharged.

19. The method of claim 14, wherein providing a second discharge current to the first node to discharge the sampled input signal comprises providing a sourcing current as the second discharge current to the first node to cause the first node to be discharged.

* * * * *